UNITED STATES PATENT OFFICE.

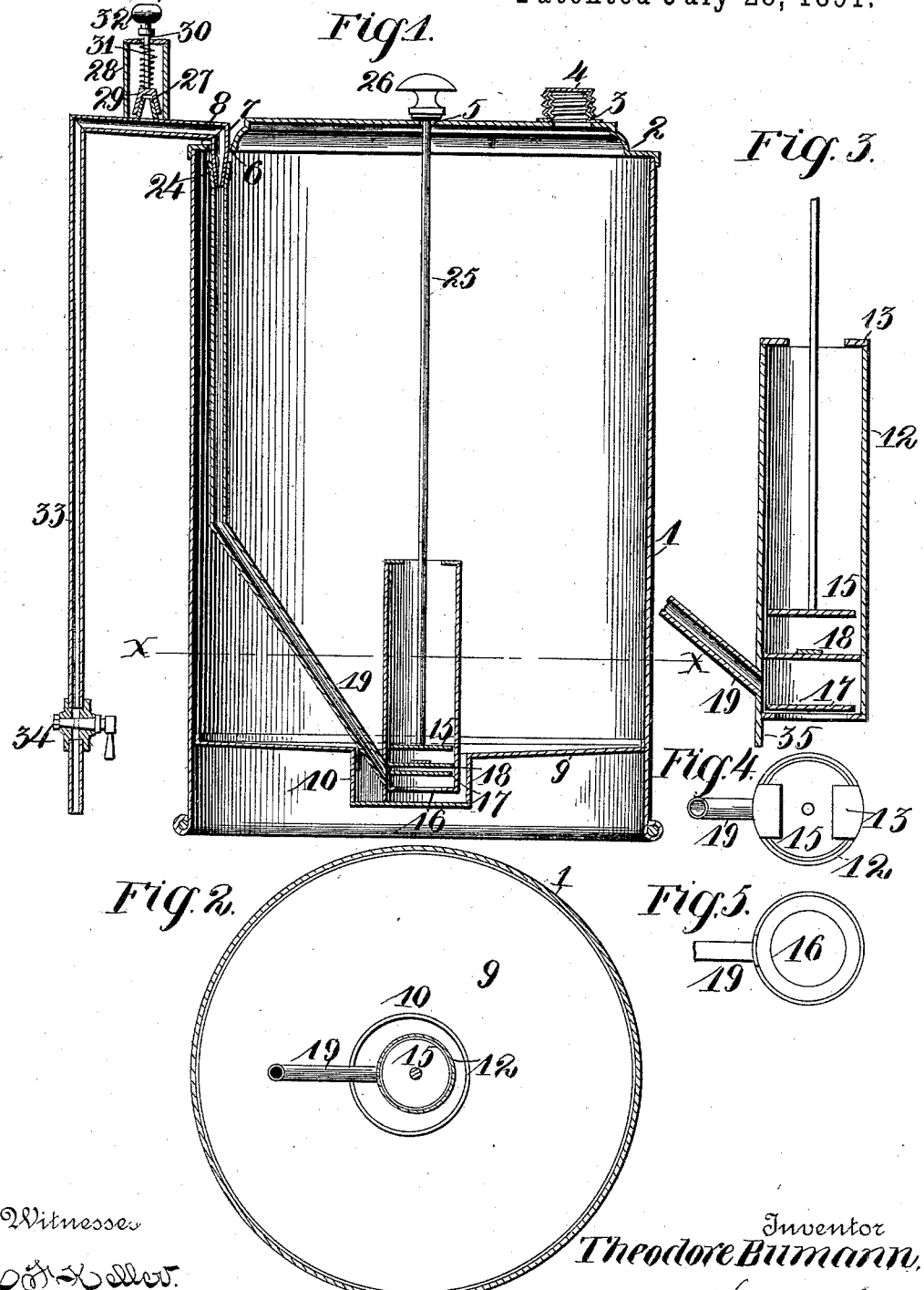

THEODORE BUMANN, OF BUNKER HILL, ILLINOIS.

OIL-CAN AND SIPHON-PUMP.

SPECIFICATION forming part of Letters Patent No. 456,758, dated July 28, 1891.

Application filed March 23, 1891. Serial No. 386,120. (No model.)

*To all whom it may concern:*

Be it known that I, THEODORE BUMANN, of Bunker Hill, Macoupin county, in the State of Illinois, have invented certain new and useful Improvements in Liquid-Receptacles, of which the following is a full, clear, and exact description, reference being had to the accompanying drawings, forming a part hereof.

My invention relates to improvements in liquid-receptacles and siphonic attachments for the same; and it consists in the novel arrangement and combination of parts, as will be more fully hereinafter described, and designated in the claims.

In the drawings, Figure 1 is a vertical longitudinal section of my complete invention. Fig. 2 is a horizontal cross-section taken on the line $x\,x$ of Fig. 1. Fig. 3 is a longitudinal section of the siphonic attachment. Fig. 4 is a top plan view of the siphonic attachment, and Fig. 5 is a bottom plan view of the same.

Referring to the drawings, 1 indicates the receptacle itself, which may be constructed of any material and made of any dimensions without affecting in the least the functional operation of my device.

2 indicates the lid of the receptacle and should be so constructed that when applied to the same it forms, as nearly as possible, an air and water tight joint. Said lid is provided with a screw-threaded nozzle 3, over which a screw-threaded cap 4 is adapted to be screwed. Said nozzle answers as a supply-orifice. Said lid is also provided with a perforation 5, for the purpose hereinafter set forth, and with a perforation 6, adapted to receive the tapered leg 7 of siphon 8.

9 indicates the bottom of receptacle 1, the same being provided with a downwardly-formed cavity 10, and said cavity being in direct communication with the interior space of the receptacle. The bottom 9 occupies a position a short distance above the lower edge of the walls of the receptacle, as shown in Fig. 1, in order to permit the suspension of the walls of the cavity 10 below the same and not come in contact with the floor or table or whatever object on which the receptacle may be placed. The bottom of said receptacle slopes downwardly and convergingly toward cavity 10, as can be perceived by referring to Fig. 1, such construction being devised to drain all of the liquid from said bottom in the cavity 10.

Having given a description of the peculiar construction of the receptacle, I will now proceed to describe the siphonic attachment for the same.

Referring to the siphonic attachment in detail, 12 indicates a small cylinder, the top portion of which is provided with ears 13, and is also open for the insertion of the piston 15. The lower end of said cylinder is provided with a perforation 16, over which an ordinary lift-valve 17 is adapted to fit. Said valve is adapted to move upwardly in cylinder 12; but the extent of said movement is limited by a cage 18, which may be made of any suitable construction, as desired.

19 indicates a tube, which is secured to said cylinder 12 in any suitable and mechanical manner and is in direct communication with the interior space of said cylinder. Said tube passes upward, as shown in Fig. 1, and terminates in a funnel-shaped portion 24, in which the tapered leg 7 of siphon 8 is adapted to fit. The piston 15 is adapted to work loosely in a vertical direction in cylinder 12. Said piston is firmly secured to a piston-rod 25, the same being adapted to pass through perforation 5 made in the lid.

26 indicates a knob or handle by which the piston may be operated.

Having given an explicit description of the receptacle and the siphonic attachment for the same, I will now proceed to describe the peculiar construction of a siphon which I employ in carrying out my invention. The siphon 8 is provided with a conical perforated projection 27, the same being in communication with the siphon. Said conical projection is incased in a cylindrical cap, and located in said cap is a valve 29, which is adapted to fit over the conical projection 27. Said valve is secured to a stem 30, and encircling said stem is a spiral spring 31, the elasticity of which holds the valve firmly on conical projection 27. 32 indicates a knob, which is secured to stem 30, for lifting valve 29 off of the conical projection 27. Siphon 8 is provided with a long leg 33, located in which is the stop-valve 34, the function of which is to prevent the waste of the liquid that has accumulated in leg 33 of the siphon after the flow of the liquid has ceased. Cylinder 12 is provided with a projection 35, which is adapted to rest on the top surface of the bottom of cavity 10, as can be readily perceived by referring to Fig. 1. Cylinder 12, and also tube 19, secured to the same, is adapted to fit down in cavity 10 in the manner as shown in Fig. 1. The valve 29, located on siphon 8, is to permit the ingress of air in said siphon for stopping the flow of liquid, which requires no further description.

Having described the mechanical parts of my invention, I will now proceed to describe the operation of same. The parts are made and put together substantially as shown in Fig. 1. The receptacle 1 should be then filled with any liquid, and in order to draw off the same the operator should first lift the piston 15 and then force the same down rapidly. This action will start the liquid to pass upwardly in the tube 19, and thence into siphon 8, and in order to stop the flow of liquid it is only necessary to elevate valve 29 off of conical projection 27 and permit the ingress of air into siphon 8, which will stop the flow of liquid. Of course during this operation the stop-cock valve 34 should be left open; but when it is desired to stop the flow of liquid instantly the same should be closed previously to the stoppage. I can stop the flow of the liquid by raising the piston-rod quickly, and in this case it is not necessary to elevate valve 29 or to close the stop-cock, making it possible to stop the flow three different ways.

Having fully described my invention, what I claim is—

1. In a siphonic liquid-receptacle, a can or receptacle proper, a siphon-tube leading from the same, a hollow conical projection on said tube through which air may enter to check the flow of liquid, a cap covering said projection, a stem by which said cap may be operated, and a spring to normally hold the cap on the projection, substantially as described.

2. In a siphonic liquid-receptacle, a can or receptacle proper, a siphon-tube leading from the same, a hollow conical projection on said tube through which air may enter to check the flow of liquid, a cap covering the said projection, a stem by which said valve may be operated, a cylindrical casing 28, surrounding the stem, and a spring to normally hold the cap on the hollow projection, substantially as described.

In testimony whereof I affix my signature in presence of two witnesses.

THEODORE BUMANN.

Witnesses:
S. N. SANFORD,
CHAS. S. LOW.